US012200585B2

(12) United States Patent
Lee

(10) Patent No.: US 12,200,585 B2
(45) Date of Patent: Jan. 14, 2025

(54) METHOD OF PERFORMING DYNAMIC EDGE APPLICATION SERVER (EAS) INSTANTIATION TRIGGERING AND APPARATUS FOR PERFORMING THE SAME

(71) Applicant: ELECTRONICS AND TELECOMMUNICATIONS RESEARCH INSTITUTE, Daejeon (KR)

(72) Inventor: Seung-Ik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/314,468

(22) Filed: May 9, 2023

(65) Prior Publication Data

US 2023/0370825 A1 Nov. 16, 2023

(30) Foreign Application Priority Data

| May 10, 2022 | (KR) | ........................ 10-2022-0057380 |
| Jan. 10, 2023 | (KR) | ........................ 10-2023-0003657 |
| Feb. 20, 2023 | (KR) | ........................ 10-2023-0022390 |
| Apr. 25, 2023 | (KR) | ........................ 10-2023-0054332 |

(51) Int. Cl.
*H04L 67/10* (2022.01)
*H04L 67/51* (2022.01)
*H04W 4/50* (2018.01)
*H04W 48/16* (2009.01)

(52) U.S. Cl.
CPC ............. *H04W 4/50* (2018.02); *H04W 48/16* (2013.01)

(58) Field of Classification Search
CPC ........ H04W 4/50; H04W 48/16; H04L 67/10; H04L 67/51
USPC .......................................... 709/203
See application file for complete search history.

(56) References Cited

U.S. PATENT DOCUMENTS

| 10,567,937 | B2 | | 2/2020 | Ramirez et al. | |
| 11,212,360 | B2 | * | 12/2021 | Kim | ...................... H04L 47/286 |
| 11,496,532 | B2 | * | 11/2022 | Kolan | ..................... H04L 65/60 |
| 2017/0303259 | A1 | | 10/2017 | Lee et al. | |
| 2019/0230556 | A1 | | 7/2019 | Lee | |
| 2021/0352156 | A1 | * | 11/2021 | Kim | ........................ H04W 8/24 |

(Continued)

FOREIGN PATENT DOCUMENTS

KR 10-2021-0136850 A 11/2021

OTHER PUBLICATIONS

3GPP TS 23.558 V17.0.0 (Jun. 2021), 3rd Generation Partnership Project; Technical Specification Group Services and System Aspects; Architecture for enabling Edge Applications, (Release 17), pp. 1-157.

(Continued)

*Primary Examiner* — Jude Jean Gilles
(74) *Attorney, Agent, or Firm* — Rabin & Berdo, P.C.

(57) ABSTRACT

A method of performing dynamic edge application server (EAS) instantiation triggering and an apparatus for performing the method are provided. The method of performing dynamic EAS triggering includes triggering dynamic EAS instantiation in response to an EAS discovery subscription request, transmitting a report on a need of instantiation of a target EAS, and transmitting a result of the target EAS instantiation to an edge enabler server (EES) that transmits the EAS discovery subscription request.

16 Claims, 5 Drawing Sheets

(56) References Cited

U.S. PATENT DOCUMENTS

| | | | |
|---|---|---|---|
| 2021/0352511 A1* | 11/2021 | Lee | H04L 67/125 |
| 2022/0014799 A1* | 1/2022 | Sodagar | H04L 65/61 |
| 2022/0086218 A1* | 3/2022 | Sabella | H04M 15/66 |
| 2022/0240061 A1* | 7/2022 | Sodagar | H04L 67/1008 |
| 2022/0377389 A1* | 11/2022 | Sodagar | H04L 65/80 |
| 2023/0135699 A1* | 5/2023 | Liao | H04W 4/50 |
| | | | 370/252 |

OTHER PUBLICATIONS

ETRI et al., "New Solution for KI#9: Dynamic EAS instantiation triggering and notification", 3GPP TSG-SA WG6 Meeting #49-e meeting, pp. 1-7, May 16-25, 2022.

ETRI et al., "Supporting dynamic EAS instantiation triggering and notifications", 3GPP TSG-SA6 Meeting #52-bis-e, S6-230087, Jan. 11-20, 2023.

ETRI et al., "Supporting dynamic EAS instantiation triggering and notifications", 3GPP TSG-SA6 Meeting #52-bis-e, S6-230495R1, Jan. 11-20, 2023.

ETRI, "New solution for EAS/API/EES Dynamic Instantiation Triggering", 3GPP TSG-SA WG6 Meeting #46-e meeting, pp. 1-2, Nov. 15-23, 2021.

ETRI, "New solution for SFC support of EDGEAPP", 3GPP TSG-SA WG6 Meeting #46-e meeting, pp. 1-2, Nov. 15-23, 2021.

InterDigital, "Solution for KI#9—Enhancement of dynamic EAS instantiation triggering", 3GPP TSG-SA WG6 Meeting #47-e, S6-220021 (revision of S6-212719, 212625), Feb. 14-22, 2022.

* cited by examiner

METHOD OF PERFORMING DYNAMIC EDGE APPLICATION SERVER (EAS) INSTANTIATION TRIGGERING AND APPARATUS FOR PERFORMING THE SAME

CROSS-REFERENCE TO RELATED APPLICATION

This application claims the benefit of Korean Patent Application No. 10-2022-0057380 filed on May 10, 2022, Korean Patent Application No. 10-2023-0003657 filed on Jan. 10, 2023, Korean Patent Application No. 10-2023-0022390 filed on Feb. 20, 2023, and Korean Patent Application No. 10-2023-0054332 filed on Apr. 25, 2023, in the Korean Intellectual Property Office, the entire disclosure of which are incorporated herein by reference for all purposes.

BACKGROUND

1. Field of the Invention

The following description relates to a method of performing dynamic edge application server (EAS) instantiation triggering and an apparatus for performing the same.

2. Description of the Related Art

An edge computing technique of transmitting data by using an edge server has been discussed. The edge computing technique may include multi-access edge computing (MEC) or fog computing (FOC). The edge computing technique may refer to a method of providing data to an electronic device through a separate server (e.g., an edge data network, a MEC server, or a mobile edge host) installed geographically close to the electronic device, for example, inside a base station or near the base station. For example, an application requiring low latency among applications installed in an electronic device may transmit/receive data through an edge server installed at a geographically close location without a server located in an external data network (DN) (e.g., the Internet).

A service (e.g., a MEC-based service or an edge computing service) using the edge computing technique has been discussed and research and development have been conducted for an electronic device to support the edge computing service. For example, an application of an electronic device may transmit/receive edge computing-based data on an application layer and an edge server (or an application of the edge server).

As research and development have progressed to support the edge computing service, a method of efficiently operating a MEC system resource has been discussed while satisfying a latency requirement of a service by an edge DN (e.g., a MEC server) that provides the edge computing service. For example, in a hierarchical edge DN, a method of redeploying an edge computing service to a terminal has been studied.

The above description is information the inventor(s) acquired during the course of conceiving the present disclosure, or already possessed at the time, and is not necessarily art publicly known before the present application was filed.

SUMMARY

According to exclusiveness of existing mobile communication networks, it is difficult to use network information and service of an external multi-access edge computing (MEC) application and interwork between systems. Thus, a 5G MEC technique is limited to network operator-led usage, and the expansion effect of the 5G+ integrated service industry may be limited. To expand the 5G+ integrated service industry, it may be required to share network resources and services in the 5G network and dynamically support and manage a service application programming interface (API) and a service resource exposed (or provided) by a third party service operator.

One embodiment provide a method of performing dynamic edge application server (EAS) instantiation triggering to efficiently use an edge data network (EDN) resource for EAS deployment.

However, the technical aspects are not limited to the aforementioned aspects, and other technical aspects may be present.

According to an aspect, there is provided a method of dynamically triggering EAS instantiation including triggering dynamic EAS instantiation in response to an EAS discovery subscription request, transmitting a report on a need of instantiation of a target EAS, and transmitting a result of the target EAS instantiation to an edge enabler server (EES) that transmits the EAS discovery subscription request.

The triggering includes determining whether EAS instantiation is required based on information on an instantiable EAS.

The information includes dynamic EAS instantiation information.

The triggering includes, when an available EAS instance that matches an EAS discovery filter does not exist during EAS discovery, determining whether EAS instantiation is required.

The EAS discovery subscription request includes the EAS discovery filter.

The triggering includes determining whether EAS instantiation is required based on a requesting service characteristic provided by an EAS discovery filter or a service load of an EAS maintained by the EES.

The transmitting of the report includes transmitting the report to an edge computing service provider (ECSP) management system by invoking a management service (MnS) application programming interface (API).

The method further includes, when the target EAS is instantiated, obtaining an EAS profile of the target EAS during an EAS registration procedure of the target EAS.

The result of the target EAS instantiation includes the EAS profile.

According to an aspect, there is provided an apparatus for dynamically triggering EAS instantiation, including a processor, and a memory electrically connected to the processor and configured to store instructions executable by the processor, wherein the processor performs a plurality of operations when the instructions are executed by the processor, and wherein the plurality of operations includes triggering dynamic EAS instantiation in response to an EAS discovery subscription request, transmitting a report on a need of instantiation of a target EAS, and transmitting a result of the target EAS instantiation to an EES that transmits the EAS discovery subscription request.

The triggering includes determining whether EAS instantiation is required based on information on an instantiable EAS.

The information includes dynamic EAS instantiation information.

The triggering includes, when an available EAS instance that matches an EAS discovery filter does not exist during EAS discovery, determining whether EAS instantiation is required.

The EAS discovery subscription request includes the EAS discovery filter.

The triggering includes determining whether EAS instantiation is required based on a requesting service characteristic provided by an EAS discovery filter or a service load of an EAS maintained by the EES.

The transmitting of the report includes transmitting the report to an ECSP management system by invoking an MnS API.

The plurality of operations further includes, when the target EAS is instantiated, obtaining an EAS profile of the target EAS during an EAS registration procedure of the target EAS.

The result of the target EAS instantiation includes the EAS profile.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
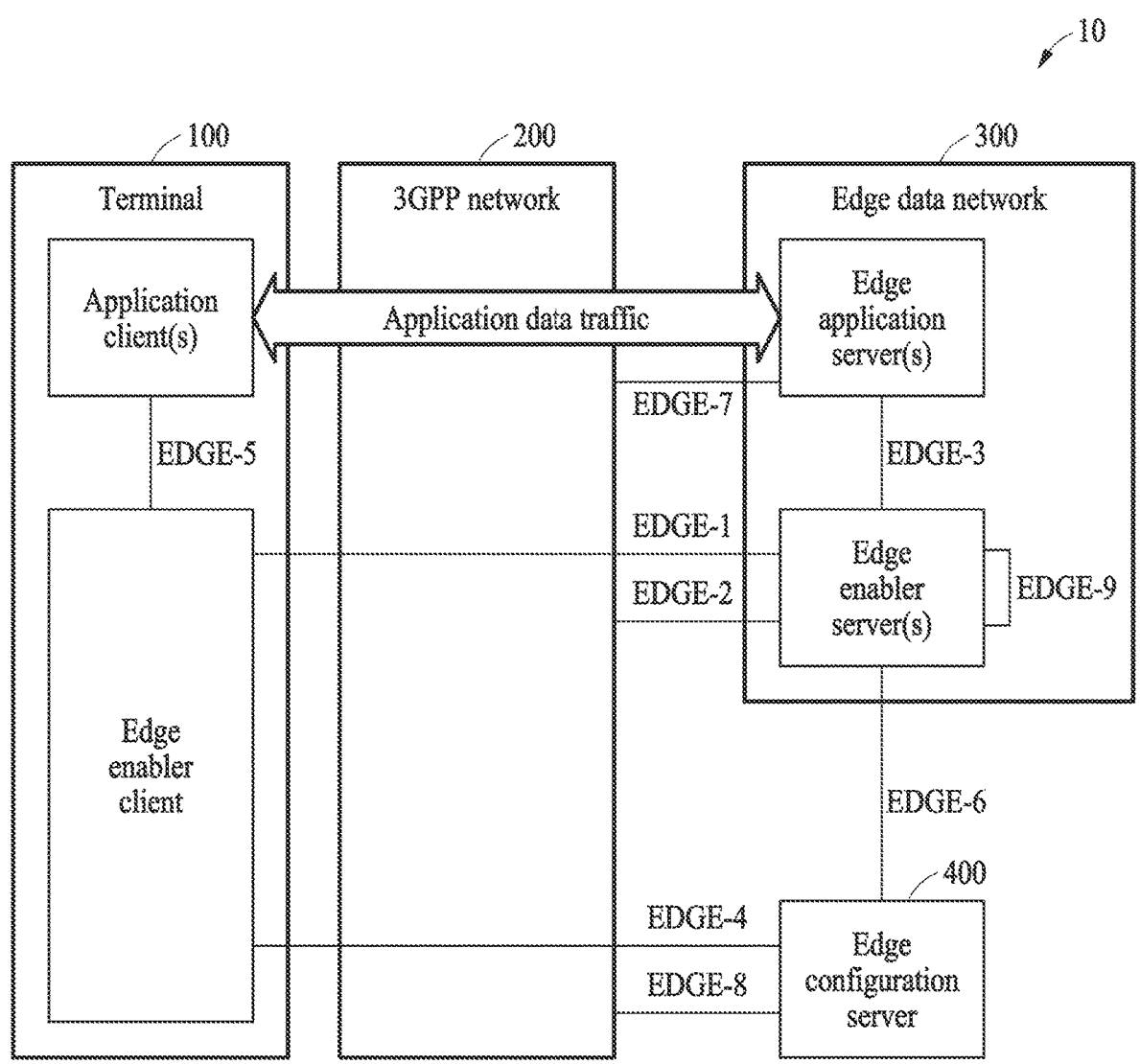
FIG. 1 is a diagram schematically illustrating a network environment for supporting an edge computing service, according to one embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components, elements and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The term "unit" or the like used herein may refer to a software or hardware component, such as a field-programmable gate array (FPGA) or an application-specific integrated circuit (ASIC), and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the examples with reference to the accompanying drawings, like reference numerals refer to like components and a repeated description related thereto will be omitted.

FIG. 1 is a diagram schematically illustrating a network environment for supporting an edge computing service, according to an example embodiment.

Referring to FIG. 1, a network environment 10 (e.g., a third generation partnership project (3GPP) 5G multi-access edge computing (MEC) platform (e.g., an EDGEAPP)) may include a terminal 100, a 3GPP network (e.g., a 3GPP core network) 200, an edge data network 300, and an edge configuration server (ECS) (e.g., an edge data network configuration server) 400. The network environment 10 may not be limited to the components 100 to 400 illustrated in FIG. 1.

Each component included in the network environment 10 may represent a physical entity unit or may represent software or a module performing individual functions. A component included in the network environment 10 may be referred to as an entity or a function.

The terminal 100 may be a device used by a user. For example, the terminal 100 may represent user equipment (UE), a remote terminal, a wireless terminal, or a user device. The terminal 100 may include all types of electronic devices.

The terminal 100 may include one or more application clients (AC) and edge enabler clients (EEC). An AC may be referred to as an UE application (UE app) or a client application.

The terminal 100 may execute (or run) one or more ACs. An AC may require different application services.

The AC may represent a default application pre-installed on the terminal 100 or an application provided by a third party. The AC may represent a client application program run on the terminal 100 for a predetermined application service. Various ACs may run on the terminal 100. At least one of ACs may be used for providing an edge computing service to the terminal 100 from the edge data network 300. The AC may exchange service data through interaction with an edge application server (EAS) as a client side of a MEC application. For example, the AC may be an application installed on the terminal 100 and executed and may provide a function to transmit/receive to or from data through the edge data network 300. The AC may represent application software (or a module) executed by the terminal 100 to use a function provided by one or more predetermined EASs (e.g., an edge application).

An EEC may represent a layer that performs an operation in the terminal 100 that enables the terminal 100 to use an edge computing service. The EEC may determine which AC (e.g., an UE app) may use an edge computing service and may connect a network interface to the edge data network 300 configured to provide the edge computing service to transmit data of the AC of the terminal 100. The EEC may search for and find an EAS.

The 3GPP communication layer may represent a layer configured to perform a modem operation to use a mobile communication system and may perform an operation of establishing wireless connection for data communication, registering the terminal 100 in the mobile communication system, establishing connection for data transmission to the mobile communication system, and transmitting/receiving data.

The 3GPP network 200 may be a wireless communication system compliant to a 3GPP standard and may provide a wireless communication service to the terminal 100 by connecting to the terminal 100. The 3GPP network 200 may include a third generation (3G) network, a long-term evolution (LTE) network, an LTE-A network, and a next generation network (5G or new radio (NR)). However, the example is not limited thereto, and the 3GPP network 200 may include a network configured by a different communication technique.

The 3GPP network 200 may include a radio access network (RAN) (not illustrated) and a core network (not illustrated). The RAN is a network directly connected to the terminal 100 and may be an infrastructure configured to provide wireless connection to the terminal 100. The RAN may include a plurality of base stations, and the plurality of base stations may communicate with each other through an interface. At least some interfaces between the plurality of base stations may be wired or wireless. A base station may be referred to as a gNode B, an eNode B, a Node B, a BS, a wireless connection unit, a base station controller, a node in a network, or other terms having an equivalent technical meaning. The core network may process a control signal and data on the terminal 100 transmitted/received through the RAN. The core network may perform various functions, such as controlling a user plane and a control plane, processing mobility, managing subscriber information, billing, interoperating with a different system (e.g., an LTE system). To perform the various functions described above, the core network may include a plurality of entities functionally separated and having different network functions (NFs). For example, the core network may include any one or any combination of a user plane function (UPF), an access and mobility management function (AMF), a session management function (SMF), a policy control function (PCF), a network exposure function (NEF), a user data management (UDM), a network data analysis function (NWDAF), and a gateway mobile location center (GMLC).

The UPF may provide a data path (or a data plane) between the terminal 100 and the edge data network 300. The UPF may function as a gateway configured to deliver data (or a data packet) transmitted or received by the terminal.

The terminal 100 and the edge data network 300 may transmit/receive to or from data (or a data packet) through the UPF. A data network (DN) may exist between the edge data network 300 and the UPF.

The UPF may be disposed near the edge data network 300 to support an edge computing service to the terminal 100 and may transmit a data packet of the terminal 100 to the edge data network 300 at low latency or may transmit a data packet of the edge data network 300 to the terminal 100 at low latency.

The UPF may provide a data path between the terminal 100 and the edge data network 300 by using a data network connected via the Internet. Among data packets transmitted by the terminal 100, a data packet that may need to be transmitted via the Internet may be routed to a data network between the service server 400 and the terminal 100.

The NEF may be an NF to expose a capability and a service of NFs of the 3GPP network 200 to the outside. The NEF may be connected to an external server (e.g., the edge data network 300) and may transmit information of an event occurring in an NF in the 3GPP network 200 to the external server or may transmit information of an event requested by the external server to an internal NF. For example, a function and a service that the NEF exposes to the outside may include event reporting related to a location of the terminal 100, event reporting related to a session of the terminal 100, and event reporting of mobility management of the terminal 100. The external server may subscribe a function and a service that the NEF exposes and may access the function and the service.

The edge data network 300 may refer to a server to which the terminal 100 is connected to use an edge computing service. The edge data network 300 may be deployed at a location geographically close to a base station or inside the base station of the 3GPP network 200 connected to the terminal 100. The edge data network 300 may be referred to as a MEC server, a MEC host, an edge computing server, a mobile edge host, and an edge computing platform.

The edge data network 300 may include one or more EASs and one or more edge enabler server (EESs)s.

The edge data network 300 may execute (or run) one or more EASs. An EAS may be referred to as an edge application, a MEC application, or a ME (or MEC) App. An EAS may be an application (or an application server) provided by a third party (e.g., a service provider) in the edge data network 300 that provides an edge computing service. The EAS may be used to form a data session with an AC to transmit/receive data related to the AC to/from the AC. The EAS may form a data session with the AC. The data session may be a communication path formed to transmit/receive data between the EAS and the AC of the terminal 100.

The edge data network 300 may provide a virtual resource to an edge application (e.g., an EAS). For example, the virtual resource may include at least one of a computing resource, a storage resource, and a network resource (e.g., a network bandwidth), which may be used by the EAS. The EAS may be executed (or run) as a virtual machine.

The EES may be referred to as a MEC platform, a mobile edge platform (MEP), and a platform.

The EES may provide a function required to execute the EAS. For example, the EES may provide a function or an environment such that the EAS may provide an edge computing service to the terminal 100 or the EAS may consume an edge computing service. In addition, the EES may perform traffic control.

The edge computing service may collectively refer to a required procedure to use an edge application (e.g., the EAS) and an information-related service. The edge computing service may be provided or consumed by the EES and/or the EAS. For example, the EAS may provide an edge computing service to the terminal 100 or may consume an edge computing service provided by the EES to provide an edge computing service to the terminal 100. In addition, the EES may provide an edge computing service that is consumable to provide an edge computing service to the terminal 100 by the EAS. That is, the edge computing service may refer to a service provided to the terminal 100 by the edge data network 300 or the EAS or a service that is provided by the EES and consumed by the EAS.

The EES may provide an edge computing services to the EAS. For example, depending on a provided edge computing service, the EES may provide various pieces of information (e.g., data, content, information of a location of a terminal, caching data, information of a subscribed service) to the EAS. The EAS may provide an edge computing service to the terminal 100 by using an edge computing service provided by the EES. For example, the EAS may provide the edge computing service to the terminal 100 based on information provided by the EES as the edge computing service. The edge computing service provided to the terminal 100 may be a required service for the terminal 100 to run an AC (e.g. provide required data to run an AC).

The EES may include a MEC service (not illustrated) and a service registry (not illustrated). The MEC service may provide an edge computing service to EASs included in the edge data network 300. The MEC service may be implemented as software or a module that may perform an individual function. The service registry may provide information for an edge computing service available in the edge data network 300.

When an instance of the EAS is instantiated, the EES may internally register the EAS. The EES may register the EAS and may store information related to the EAS. The EAS-related information stored by the EES may include information of an edge computing service that the EAS provides to the terminal 100, information on whether the edge computing service is a required service or an optional service to the EAS, and the like.

The EAS may register a new edge computing service in the EES, may update an already registered edge computing service, or may search for an edge computing service registered in the EES. While the EAS registers or updates the edge computing service in the EES, the EAS may provide, to the EES, information of the edge computing service to be registered or updated. The EES may register the edge computing service in the service registry.

The EES may transmit, to the EAS in the edge data network 300, information of edge computing services registered in the service registry. For example, the EES may transmit a list of edge computing services registered in the service registry to the EAS. In addition, the EES may transmit, to the EAS, information of availability of edge computing services, which are registered in the service registry or newly registered.

The EAS may subscribe an edge computing service registered in the service registry. The EAS may subscribe an edge computing service by transmitting subscription request information on the edge computing service to the EES. That the EAS subscribes the edge computing service may represent that EES continuously provides the edge computing service or information of the edge computing service.

The ECS 400 may provide support functions for the terminal 100 to connect to the EES. The ECS 400 may be referred to as an edge data network management server and a configuration server and may function as a mobile edge platform manager (MEPM) or a multi-access edge orchestrator (MEO). The ECS 400 may be a MEC management proxy (MMP) server or a domain name system (DNS) server.

The ECS 400 may be an initial connection server that may be provided with edge data network configuration information for the terminal 100 to use the edge computing service. The ECS 400 may recognize deployment of edge data networks, and the terminal 100 may be provided with configuration information required to use an edge computing service by connecting to the ECS 400, for example, information of the edge computing service to be connected at a predetermined location.

The ECS 400 may provide edge data network configuration information to the EEC of the terminal 100. For example, the edge data network configuration information may include information for the terminal 100 to connect to the edge data network 300 by using service area information (e.g., information of an edge data network that provides a service to a predetermined area) and information to establish connection with an EES 330 (e.g., information to identify the edge data network).

Figure 2:
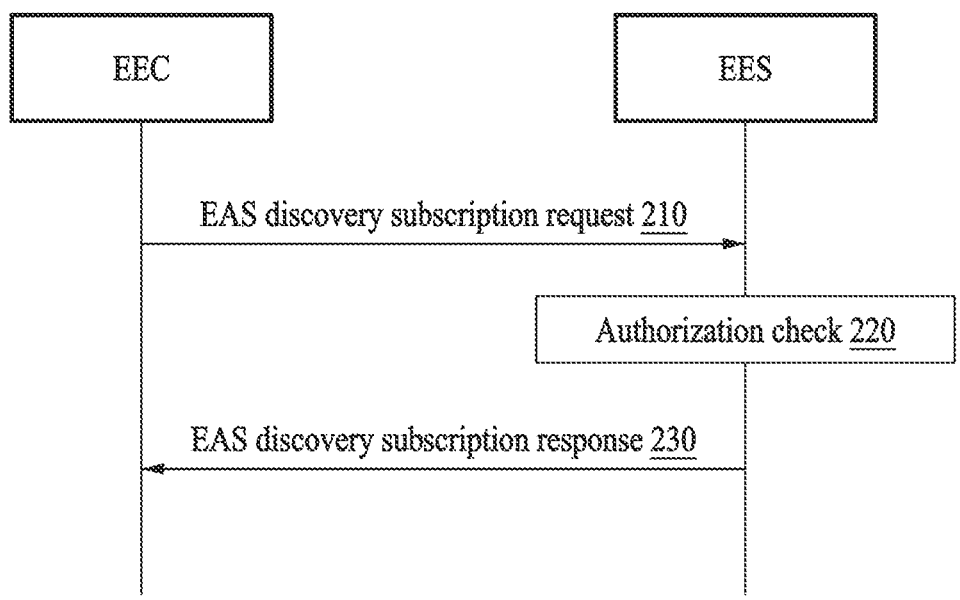
FIG. 2 is a diagram illustrating edge application server (EAS) discovery subscription according to one embodiment.

FIG. 2 is a diagram illustrating EAS discovery subscription according to one embodiment.

Referring to FIG. 2, EAS discovery is described before describing an EAS discovery subscription procedure.

An entity of edge deployment may obtain information on an EAS and an available service based on specified criteria of interest through a discovery procedure.

An EEC may obtain information on an available EAS of interest (e.g., an instantiated EAS registered in an EES and an instantiable EAS that may be generated when needed) through an EAS search. The discovery of an EAS may be based on a matching EAS discovery filter provided in a request.

When a plurality of EASs is discovered with respect to a predetermined AC, the EEC may select one or more EASs and may enable (activate) AC communication with one of the selected EASs. When the EAS is selected, the EEC may subscribe to application context relocation (ACR) event notification in the EES of the selected EAS (e.g., see the description in section 8.8.3.5.2 of TS 23.558). EDN configuration information received from the ECS may be used to establish connection with an EAS.

The EAS discovery may be initiated by the EEC when a certain trigger condition is satisfied in UE. Examples are as follows:
- an update related to an AC available in the EEC (e.g., due to AC installation, re-installation, and activation) and an AC requesting an application server access;
- when the lifetime received through an EAS discovery response expires (e.g., as specified in section 8.5.3 of TS 23.558); or
- when the EEC detects the need of ACR (e.g., see section 8.8 of TS 23.558)

When a bundle EAS is registered in another EES, the EES may transmit an EAS discovery request message to an associated EES (e.g., an EES associated with the bundle EAS) for bundle EAS information.

Referring to FIG. 2, an EAS discovery subscription procedure is described. FIG. 2 shows the EAS discovery subscription procedure between an EEC and an EES. The EES may notify EEC of various EAS discovery related events (e.g., EAS discovery notification and EAS dynamic information), in which the EEC is interested, through the subscription.

A prerequisite for EAS discovery subscription may be as follows:
i) The EEC may receive information (e.g., an URI and an IP address) related to the EES.
ii) The EEC may be configured in a policy of an edge computing service provider (ECSP) for EAS discovery.
iii) The EEC may selectively obtain a notification target address to be used for a subscription to a notification.

EAS discovery subscription may be performed through operations 210 to 230.

In operation 210, an EEC may transmit an EAS discovery subscription request to an EES. The EAS discovery subscription request may include security credentials, an event ID, and an edge enabler client identification (EECID). In addition, the EAS discovery subscription request may include an EAS discovery filter and an EAS dynamic information filter. The filters (e.g., the EAS discovery filter and the EAS dynamic information filter) may be included in the EAS discovery subscription request to subscribe to information on a category (e.g., a gaming application) of a predetermined EAS or EAS or to subscribe to information on dynamic information on the EAS.

In operation 220, in response to the request from the EEC, the EES may determine whether the EEC has authorization to subscribe to the requested information of the EAS. The authorization check may be applied to an individual EAS, a category of an EAS, or an EDN. That is, the authorization check may be applied to all EASs. The EES may utilize the capability (e.g., UE location) of a 3GPP core network (e.g., as specified in section 8.10.3 of TS 23.558). When the request is approved, the EES may generate and store a subscription to EAS discovery.

In operation 230, when the request is successfully processed, the EES may transmit an EAS discovery subscription response including a subscription identifier and an expiration time to the EEC. The expiration time may represent when the subscription automatically expires. To maintain the subscription, the EEC may transmit an EAS discovery subscription update request before the expiration time. When the EAS discovery subscription update request is not received within the expiration time, the EES may treat (or consider) that the EEC implicitly cancels the subscription.

In the subscription to an EAS availability change event, when an instantiated EAS that matches the requested EAS discovery filter does not exist and an EAS is instantiable based on pre-configured information for an instantiable EAS, the request may be treated as successful. When the EEC indicates EAS instantiation triggering for the EAS discovery subscription request, the EES may trigger dynamic instantiation of the EAS (e.g., as specified in section 8.12 of TS 23.558) and otherwise, the EES may not trigger EAS instantiation.

In the subscription to the EAS dynamic information change event, when the EES may not determine instantiated EAS information using an input of an EAS discovery subscription request, UE-specific service information in the EES, or an ECSP policy, the EES may reject the EAS discovery subscription request and may respond with an appropriate failure cause.

When the EEC is not registered in the EES and EEC registration needs to be performed based on the ECSP policy before an EAS search, the EES may include an appropriate failure cause indicating the need for EEC registration in the EAS discovery response.

When the EAS discovery subscription request fails, the EEC may transmit the EAS discovery subscription request again based on the received failure cause. When the failure cause indicates that EEC registration is required, the EEC may perform EEC registration before transmitting the EAS discovery subscription request again.

Figure 3:
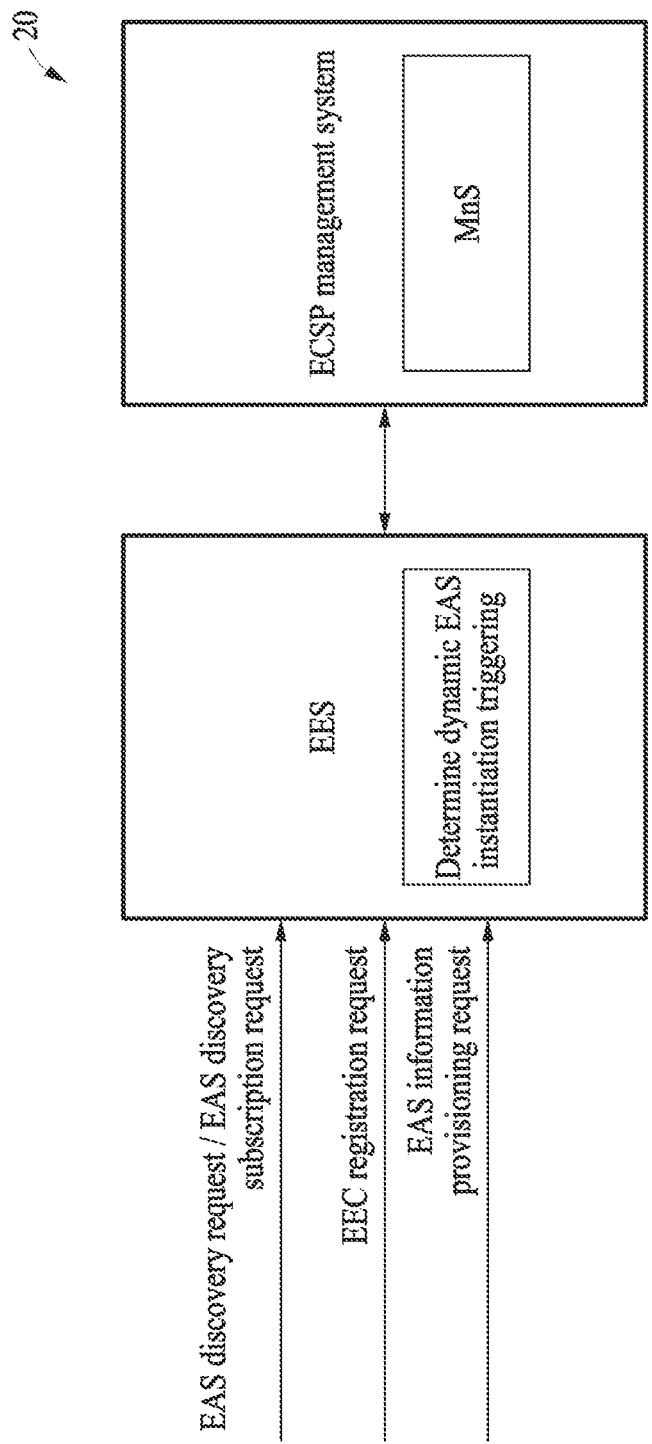
FIG. 3 is a diagram illustrating dynamic EAS instantiation triggering according to one embodiment.

FIG. 3 is a diagram illustrating dynamic EAS instantiation triggering according to one embodiment.

Referring to FIG. 3, a network environment 20 (e.g., a 3GPP 5G MEC platform (an EDGEAPP)) may include an EES and an ECSP management system. The EES may trigger dynamic EAS instantiation and the ECSP management system may be responsible for approval of dynamic EAS instantiation.

The EES may trigger dynamic EAS instantiation based on an EAS discovery request, an EAS discovery subscription request, and/or UE mobility. In addition, the EES may trigger dynamic EAS instantiation when receiving an EEC registration request including an AC profile or an EAS information provisioning request.

During a procedure for ACR or EAS discovery, when the EES receives an EAS discovery request (e.g., including an EAS discovery filter) with an EAS discovery filter from an EEC or a source-EES (S-EES), the EES may not discover and select an EAS that matches UE location and a requesting application characteristic (e.g., as specified in table 8.5.3.2-2 of TS 23.558) because there is no available or instantiated EAS.

The EES may trigger the ECSP management system (e.g., as specified in TS 28.538) based on pre-configured dynamic EAS instantiation information to instantiate an EAS that provides a service to an AC in an EDN corresponding to an instantiable EAS before returning EAS information to the EEC or the S-EES. The pre-configured dynamic EAS instantiation information may be information on an EAS that may dynamically instantiate an EAS in a connected (or associated) EDN. The pre-configured dynamic EAS instantiation information may be provided in the ECSP management system. When EAS selection is performed by the EES, the selected EAS may be dynamically instantiated if applicable.

When one or more EAS discovery subscription requests for availability of the EAS are received, the EES may determine whether EAS instantiation is required based on the pre-configured information (e.g., pre-configured dynamic EAS instantiation information) on an instantiable EAS. In addition, the EES may determine whether EAS instantiation is required by additionally considering a requesting service characteristic (e.g., a location and latency) by the EEC and/or a service load or capacity (e.g., the number of service sessions) of the EEC.

When the EES determines that EAS instantiation is required, the EES may provide, to the ECSP management system, an indication for requesting instantiation of a target EAS through the EAS instantiation request. To consider instantiation of a target EAS that is determined to be instantiated, the EES may invoke a management service (MnS) application programming interface (API) of the ECSP management system and may transmit a report on the need of EAS instantiation to the ECSP management system (e.g., as specified in TS 28.538). The MnS API for EAS instantiation request and notification may be provided by the ECSP management system. When the requested EAS (e.g., the target EAS) is instantiated, the EES may obtain an EAS profile based on updated configuration information by the ECSP management system. For example, the EES may obtain an EAS profile during the EAS registration procedure. Thereafter, the EES may additionally notify the EEC of an instantiation result of the target EAS with the EAS profile through an EAS discovery notification procedure (e.g., as specified in 8.5.2.3.2 of TS 23.558) to notify the EEC of availability (e.g., an available change event) of an instance of the target EAS. The instantiation result of the target EAS may include the EAS profile.

The EAS discovery subscribe-notify procedure (e.g., as specified in section 8.5.2.3 of TS 23.558) may be reused. The EEC may request the EES to subscribe to EAS discovery (in other words, the EEC may request the EES for EAS discovery subscription). When the EES receives a notification (or information) on EAS instantiation, the EES may notify an EEC of which an EAS search filter matches an EAS instance.

When receiving an EAS information provisioning request, the EES may trigger the EAS management system to instantiate an EAS in an EDN before returning the EAS information to the EEC.

Figure 4:
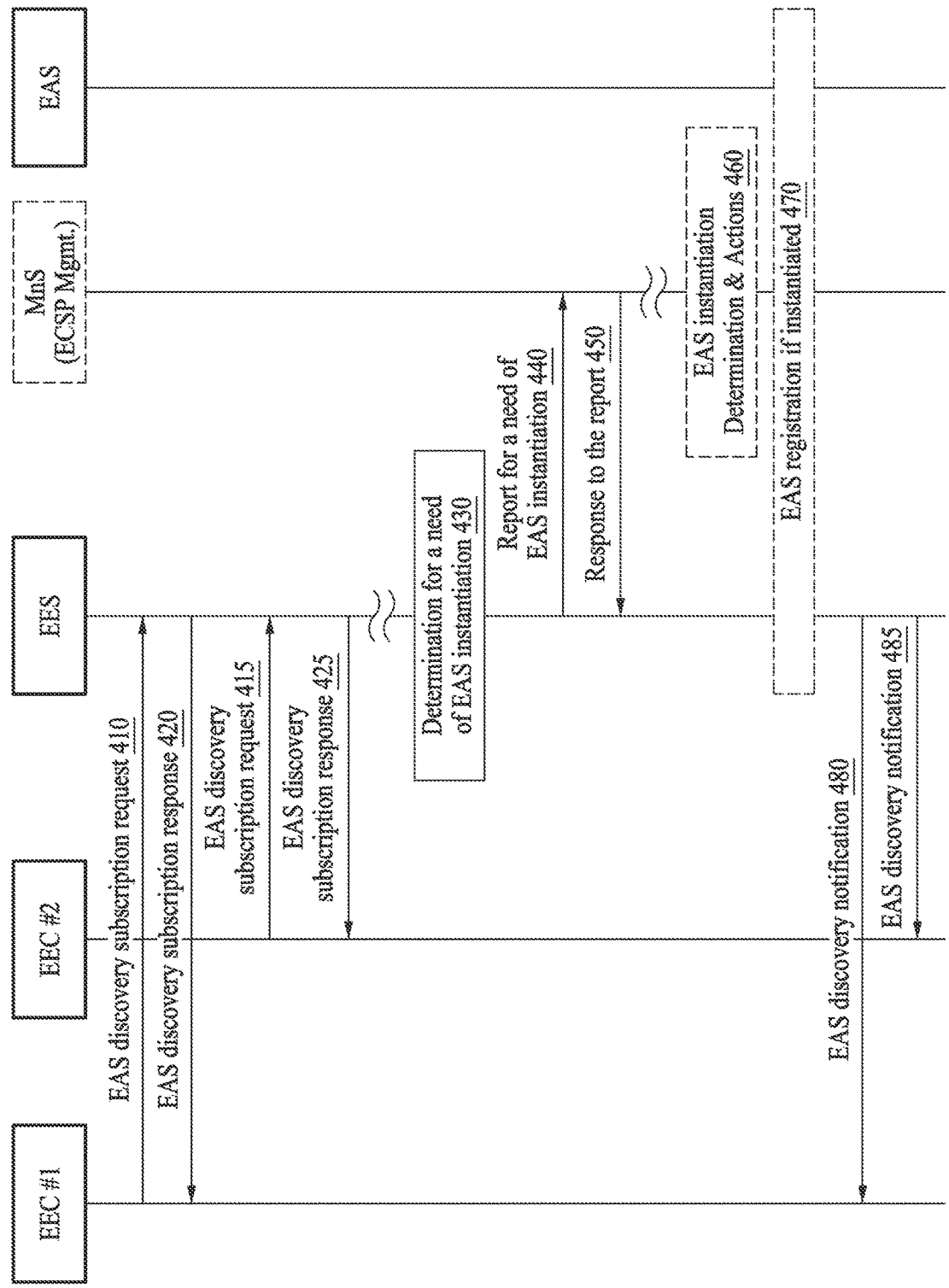
FIG. 4 is a diagram illustrating dynamic EAS instantiation triggering and notification procedures according to one embodiment.

FIG. 4 is a diagram illustrating dynamic EAS instantiation triggering and notification procedures according to one embodiment.

In FIG. 4, an EES may be pre-configured with information on an instantiable EAS that may be provided by an ECSP management system.

In operation 410, a first EEC EEC #1 may transmit an EAS discovery subscription request to an EES that triggers an input event for dynamic EAS instantiation.

In operation 415, a second EEC EEC #2 may transmit an EAS discovery subscription request to the EES that triggers an input event for dynamic EAS instantiation.

In operation 420, the EES may transmit an EAS discovery subscription response to the first EEC EEC #1.

In operation 425, the EES may transmit an EAS discovery subscription response to the second EEC EEC #2.

In operation 430, based on a triggering input event (e.g., when there is no available EAS instance that matches an EAS discovery filter during EAS discovery), the EES may determine whether EAS instantiation is required. The EES may determine whether EAS instantiation is required based on pre-configured information (e.g., pre-configured dynamic EAS instantiation information) on an instantiable EAS. In addition, the EES may determine whether EAS instantiation is required by considering a requesting service characteristic provided by the EAS discovery filter or a service load or capacity (e.g., the number of service sessions) of an EAS maintained by the EES.

In operation 440, when the EES determines that EAS instantiation is required, the EES may transmit a report on the need of EAS instantiation to the ECSP management system by invoking an MnS API of the ECSP management system to consider instantiation of the target EAS.

In operation 450, the ECSP management system may respond to the EES by indicating that the requested EAS instantiation is considered.

In operation 460, the ECSP management system may determine whether the requested EAS instantiation is allowable by analyzing a deployment requirement and an available resource and may proceed with a corresponding action.

In operation 470, when the target EAS is successfully instantiated, the EES may obtain EAS information (e.g., an EAS profile) through an EAS registration procedure of the instantiated EAS.

In operation 480, the EES may notify an associated EEC (e.g., the first EEC EEC #1) of an EAS instantiation result as an EAS discovery notification including the EAS profile, wherein the associated EEC has already started an input event triggered with respect to the target EAS instance.

In operation 485, the EES may notify an associated EEC (e.g., the second EEC EEC #2) of an EAS instantiation result as an EAS discovery notification including the EAS profile, wherein the associated EEC has already started an input event triggered with respect to the target EAS instance.

Figure 5:
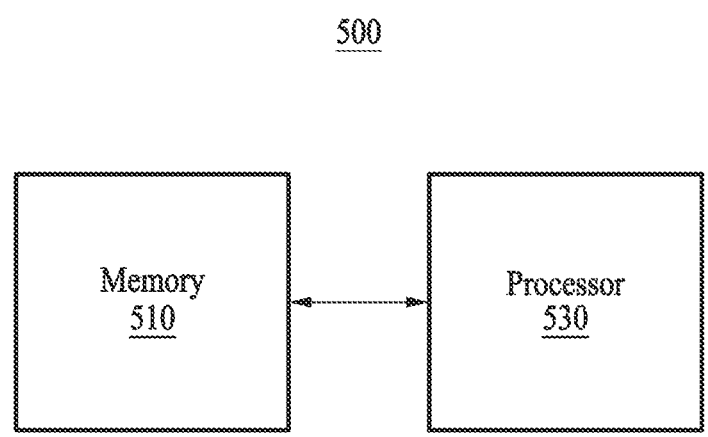
FIG. 5 is a schematic block diagram of an apparatus according to one embodiment.

FIG. 5 is a schematic block diagram of an apparatus according to one embodiment.

Referring to FIG. 5, according to one embodiment, an apparatus 500 (e.g., a server apparatus) may be substantially the same as the EES, the EEC, and/or the ECSP management system described with reference to FIGS. 1 to 4. The apparatus 500 may include a memory 510 and a processor 530.

The memory 510 may store instructions (e.g., a program) executable by the processor 530. For example, the instructions include instructions for performing an operation of the processor 530 and/or an operation of each component of the processor 530.

According to one embodiment, the memory 510 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory.

The processor 530 may execute computer-readable code (e.g., software) stored in the memory 510 and instructions triggered by the processor 530. The processor 530 may be a hardware-implemented data processing device having a circuit that is physically structured to execute desired operations. The desired operations may include code or instructions included in a program. For example, the hardware-implemented data processing device may include a microprocessor, a CPU, a processor core, a multi-core processor, a multiprocessor, an application-specific integrated circuit (ASIC), and a field-programmable gate array (FPGA).

According to one embodiment, operations performed by the processor 530 may be substantially the same as operations of the EES, the EEC, and/or the ECSP management system described with reference to FIGS. 1 to 4. Accordingly, a detailed description thereof is omitted.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of dynamically triggering edge application server (EAS) instantiation, the method comprising:
   triggering dynamic EAS instantiation in response to an EAS discovery subscription request;
   transmitting a report on a need of instantiation of a target EAS; and
   transmitting a result of the target EAS instantiation to an edge enabler server (EES) that transmits the EAS discovery subscription request,
   wherein the triggering comprises determining whether EAS instantiation is required based on a number of service sessions of an EAS maintained by the EES.

2. The method of claim 1, wherein the triggering comprises determining whether EAS instantiation is required based on information on an instantiable EAS.

3. The method of claim 2, wherein the information comprises dynamic EAS instantiation information.

4. The method of claim 1, wherein the triggering comprises, when an available EAS instance that matches an EAS discovery filter does not exist during EAS discovery, determining whether EAS instantiation is required.

5. The method of claim 4, wherein the EAS discovery subscription request comprises the EAS discovery filter.

6. The method of claim 1, wherein the transmitting of the report comprises transmitting the report to an edge computing service provider (ECSP) management system by invoking a management service (MnS) application programming interface (API).

7. The method of claim 1, further comprising:
   when the target EAS is instantiated, obtaining an EAS profile of the target EAS during an EAS registration procedure of the target EAS.

8. The method of claim 7, wherein the result of the target EAS instantiation comprises the EAS profile.

9. An apparatus for dynamically triggering edge application server (EAS) instantiation, the apparatus comprising:
   a processor; and
   a memory electrically connected to the processor and configured to store instructions executable by the processor,
   wherein the processor performs a plurality of operations when the instructions are executed by the processor, and
   wherein the plurality of operations comprises:
   triggering dynamic EAS instantiation in response to an EAS discovery subscription request;

transmitting a report on a need of instantiation of a target EAS; and transmitting a result of the target EAS instantiation to an edge enabler server (EES) that transmits the EAS discovery subscription request, wherein the triggering comprises determining whether EAS instantiation is required based on a number of service sessions of an EAS maintained by the EES.

10. The apparatus of claim 9, wherein the triggering comprises determining whether EAS instantiation is required based on information on an instantiable EAS.

11. The apparatus of claim 10, wherein the information comprises dynamic EAS instantiation information.

12. The apparatus of claim 9, wherein the triggering comprises, when an available EAS instance that matches an EAS discovery filter does not exist during EAS discovery, determining whether EAS instantiation is required.

13. The apparatus of claim 12, wherein the EAS discovery subscription request comprises the EAS discovery filter.

14. The apparatus of claim 9, wherein the transmitting of the report comprises transmitting the report to an edge computing service provider (ECSP) management system by invoking a management service (MnS) application programming interface (API).

15. The apparatus of claim 9, wherein the plurality of operations further comprises:

when the target EAS is instantiated, obtaining an EAS profile of the target EAS during an EAS registration procedure of the target EAS.

16. The apparatus of claim 15, wherein the result of the target EAS instantiation comprises the EAS profile.

* * * * *